W. K. DUNWOODY.
Switch-Bar.
No. 218,720.                    Patented Aug. 19, 1879.
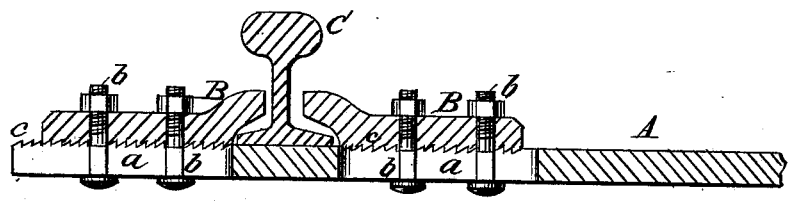
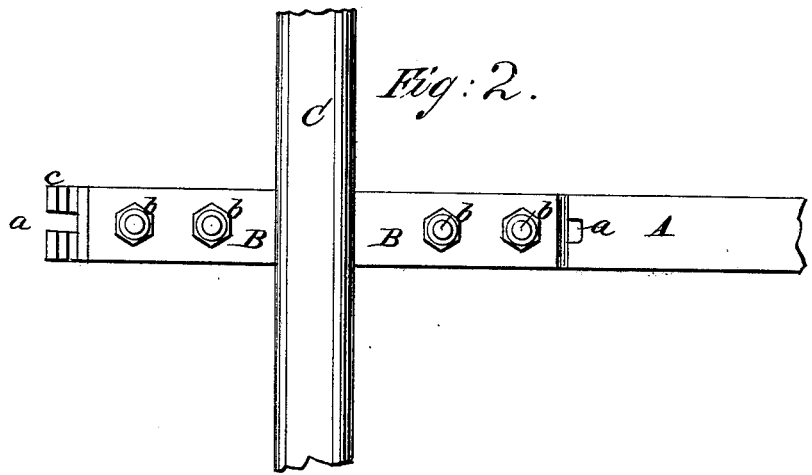
WITNESSES:                                    INVENTOR:
Achilles Schehl.                              W. K. Dunwoody
C. Sedgwick                              BY
                                              ATTORNEYS.

UNITED STATES PATENT OFFICE.

WILLIAM K. DUNWOODY, OF EAGLE MILLS, MICHIGAN.

IMPROVEMENT IN SWITCH-BARS.

Specification forming part of Letters Patent No. 218,720, dated August 19, 1879; application filed April 29, 1879.

*To all whom it may concern:*

Be it known that I, WILLIAM K. DUNWOODY, of Eagle Mills, in the county of Marquette and State of Michigan, have invented a new and Improved Switch-Bar, of which the following is a specification.

The object of my invention is to construct a switch-bar adapted for use with any usual size of rail and gage of track, and permitting ready connection or detachment of the rails.

The invention consists in a switch-bar having jaws for clamping the rails, which jaws are adjustable lengthwise of the switch-bar, whereby they may be moved to fit the rail, and the rails and jaws shifted to the desired gage.

The invention consists, further, in certain details of construction, which will be described hereinafter.

In the accompanying drawings, Figure 1 is a vertical longitudinal section at one end of one of my improved switch-bars. Fig. 2 is a top view of the same.

Similar letters of reference indicate corresponding parts.

A is a bar of wrought-iron, formed at each end with slots $a\ a$, that extend in a direction lengthwise of the bar. At each end of bar A are the movable jaws B B, which are held in position by bolts $b\ b$, that pass through slots $a$, and have nuts on their ends projecting above the jaws. The rail C is clamped between the inner ends of the jaws B, and by loosening the nuts of bolts $b$ either or both of the jaws can be set up to fit closely against the rail, and the nuts then screwed up to hold the rail securely in place.

The under side of each jaw B and the surface of bar A are serrated, notched, or grooved, as at $c$, so that the jaws are held more securely from slipping on the bar.

This construction permits the use of the switch-bar with rails of any usual size, and allows adjustment of the rails to the desired gage. This adjustment can be made by moving either rail and its clamping-jaws upon the switch-bar, or both rails can be moved, if required, to adapt them to the gage.

When it is necessary to remove a rail from the switch-bar it can be readily and quickly done by loosening the jaws at one side of the rail and sliding them back, thus saving the pulling and hammering required with switch-bars as heretofore made.

The bolts $b$ will be formed with a squared portion to prevent them turning in the slots $a$.

Having thus described my invention, I claim as new and desire to secure by Letters Patent—

As an improved switch-bar, the bar A, formed with slots $a$, and having clamping-jaws B, attached by bolts passing through the slots, substantially as and for the purposes set forth.

WM. K. DUNWOODY.

Witnesses:
M. McCALLUM,
E. CONAHAN.